(12) United States Patent
Cordes et al.

(10) Patent No.: US 7,816,828 B2
(45) Date of Patent: Oct. 19, 2010

(54) SYNCHRONOUS MACHINE

(75) Inventors: Ralf Cordes, Erlangen (DE); Jan Weigel, Großenbuch (DE); Markus Wilke, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 169 days.

(21) Appl. No.: 11/992,847

(22) PCT Filed: Sep. 12, 2006

(86) PCT No.: PCT/EP2006/066275

§ 371 (c)(1),
(2), (4) Date: Mar. 31, 2008

(87) PCT Pub. No.: WO2007/036429

PCT Pub. Date: Apr. 5, 2007

(65) Prior Publication Data

US 2009/0273251 A1 Nov. 5, 2009

(30) Foreign Application Priority Data

Sep. 30, 2005 (DE) ........................ 10 2005 047 451

(51) Int. Cl.
*H02K 19/38* (2006.01)
*H02K 11/02* (2006.01)

(52) U.S. Cl. ..................... 310/89; 336/120; 336/132; 29/622

(58) Field of Classification Search ............... 310/226, 310/227, 231, 216, 85, 86; 336/132, 120; 29/622

See application file for complete search history.

(56) References Cited

U.S. PATENT DOCUMENTS

| 4,034,245 | A | * | 7/1977 | Mailfert et al. ............... 310/52 |
| 4,344,126 | A | * | 8/1982 | Schumacher ................ 363/126 |
| 4,364,005 | A | * | 12/1982 | Kohzai et al. ................ 322/31 |
| 4,404,485 | A | * | 9/1983 | Ban et al. ................... 310/198 |
| 4,745,315 | A | | 5/1988 | Terry, Jr. et al. |
| 5,097,163 | A | * | 3/1992 | Shah et al. .................... 310/51 |
| 5,519,275 | A | | 5/1996 | Scott et al. |
| 5,942,828 | A | * | 8/1999 | Hill ............................ 310/164 |
| 6,118,201 | A | * | 9/2000 | Dulin et al. ................. 310/161 |

(Continued)

FOREIGN PATENT DOCUMENTS

DE    202 04 584  U1    9/2003

(Continued)

OTHER PUBLICATIONS

English Abstract for Japanese Published Patent Application 6008202 A, published May 10, 1985.

(Continued)

*Primary Examiner*—Quyen Leung
*Assistant Examiner*—Terrance Kenerly
(74) *Attorney, Agent, or Firm*—Staas & Halsey LLP

(57) ABSTRACT

A magnet wheel and a stator winding which are necessary for an excitation device are included in a synchronous machine. Energy is transferred to the magnet wheel through inductivity, preferably, energy to a super-conductive coil, by the excitation device. Protection against the magnetic field produced by the current in the winding head is provided in the form of a specific system which is used to reduce the corruptions of the interfering fields of stator and rotor winding.

26 Claims, 3 Drawing Sheets

U.S. PATENT DOCUMENTS

| | | | |
|---|---|---|---|
| 6,897,756 B2 * | 5/2005 | Haisch | 336/130 |
| 7,119,644 B2 * | 10/2006 | Snitchler et al. | 335/216 |
| 2002/0125779 A1 * | 9/2002 | Qin et al. | 310/156.12 |
| 2003/0155820 A1 * | 8/2003 | Tominaga et al. | 310/12 |
| 2003/0189386 A1 * | 10/2003 | Carl | 310/254 |
| 2004/0104632 A1 * | 6/2004 | Keene et al. | 310/85 |
| 2004/0155546 A1 * | 8/2004 | Stevens et al. | 310/156.01 |
| 2004/0256922 A1 | 12/2004 | Steinmeyer | |
| 2006/0165985 A1 * | 7/2006 | Matsukawa et al. | 428/384 |
| 2007/0070559 A1 | 3/2007 | Steinmeyer | |

FOREIGN PATENT DOCUMENTS

| | | |
|---|---|---|
| GB | 1 454 211 | 11/1976 |
| WO | 95/26069 | 9/1995 |
| WO | 03/047077 A1 | 6/2003 |

OTHER PUBLICATIONS

German Office Action for Application No. 10 2005 047.9-32; dated Sep. 26, 2006.

International Search Report for Application No. PCT/EP2006/066275; mailed Jan. 12, 2007.

* cited by examiner

SYNCHRONOUS MACHINE

CROSS REFERENCE TO RELATED APPLICATIONS

This application is based on and hereby claims priority to German Application No. 10 2005 047 451.9 filed on Sep. 30, 2005, the contents of which are hereby incorporated by reference.

BACKGROUND

Described below is a synchronous machine, containing a stator winding and a rotor inductance, with an excitation device for driving and monitoring the rotor inductance.

Specific excitation devices are provided for synchronous machines for use as electrical generators or motors. In particular in the case of machines with superconducting exciter windings, in which the current needs to be built up and reduced in a targeted manner, excitation devices including inverters, transformers and synchronous rectifiers are suitable, as are described, for example, in parallel applications by the Applicant with the same priority.

The installation site of such an excitation device should be as close as possible to the rotor inductance in order to minimize the losses on feed lines. In particular in the case of such superconducting windings which are constructed using HTS (high-temperature superconducting) technology, protection for the superconducting rotor inductance needs to be implemented which should be fitted as close as possible to the superconducting inductance in order to rule out the probability of breakage of the cable and the associated destruction of the superconducting rotor inductance or to keep this probability as low as possible.

The magnetic field produced by the currents in the winding head, on the one hand, and the stator and rotor stray field emerging from the air gap, on the other hand, are problematic for the latter excitation device. These undesirable magnetic fields can disrupt electronics located there and in particular bring the ferromagnetic materials of the transformer to saturation and therefore render them functionless.

An aspect of the synchronous machine is to use the available space below the stator winding head as the installation site for contactless energy and data transmission without introducing faults. In particular, it should in this case equally be possible to use a special protection concept for an advantageous use of HTS coils on the rotor.

SUMMARY

An inner (with respect to the machine construction) excitation device for electric machines with contactless energy transmission and magnetic shielding is realized.

Described below is a machine with superconducting windings, in particular made of HTS material. However, the design can also be applied in all known synchronous machines.

As a result, the disruptive external fields of stator and rotor windings are weakened in a suitable manner. Thus, a contactless energy transmission method with an inductive coupling of magnetic core materials, in particular of ferrites provided there, can be used to the full for the first time.

It is known from the related art that the magnetic flux density at the installation site of the excitation device is a few 10 mT. As a result of the magnetic components contained in the excitation device, such as in particular the ferrites, however, the field strength distribution is distorted in such a way that these components are magnetically saturated and therefore often, as has already been mentioned above, no longer function correctly.

On the other hand, required field strength distributions can be predetermined in a targeted manner and in particular the regions of the excitation device with the sensitive electronics can be freed of disruptive fields, which could impair the functioning of individual components of the electronics.

In a targeted development, different embodiments for the design of the shield as well as the housing are possible, a combination of variants also being possible.

Advantageously, the entire housing for the excitation device can be made of magnetic steel, whereby the external fields are shielded to the greatest possible extent.

A stationary or laminated screen made of magnetic steel can also be provided which at least partially surrounds the rotating housing of the excitation device.

BRIEF DESCRIPTION OF THE DRAWINGS

These and other aspects and advantages will become more apparent and more readily appreciated from the following description of exemplary embodiments, taken in conjunction with the accompanying drawings of which.

DETAILED DESCRIPTION OF THE PREFERRED EMBODIMENT

Reference will now be made in detail to exemplary embodiments which are illustrated in the accompanying drawings, wherein like reference symbols refer to like elements throughout.

The drawings illustrate an electric machine which either functions as an electrical generator or as a motor. Essential to such a machine is a rotating shaft 2, which is mounted in at least two mounts 3, 3'.

It can be seen from the schematic illustration in FIG. 1 that a rotor 5 is arranged on the shaft 2, on which rotor windings, in particular superconducting windings made of HTS material, are located, which will be clarified further below with reference to FIGS. 2 and 3.

Figure 1:
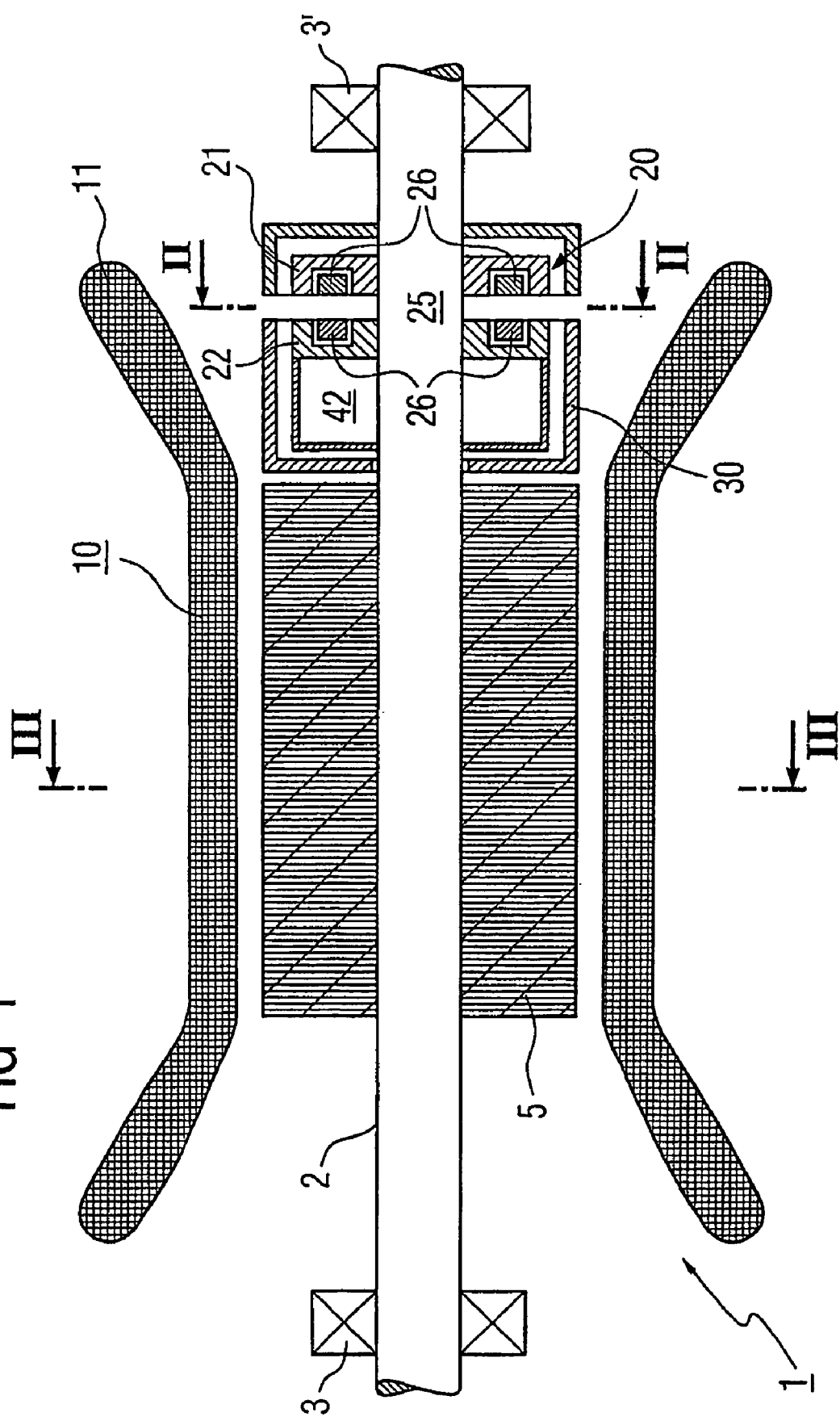
FIG. 1 is a schematic, sectional illustration of an electric synchronous machine with a stator winding, rotor and excitation device including a transformer.

It can furthermore be seen in FIG. 1 that a stator winding 10 with winding heads 11, 11' is provided opposite the rotor 5 as the rotating element.

Especially in FIG. 1 an excitation device 20 is provided which is substantially formed by a fixed part 21 and a rotating part 22. The two parts 21 and 22 have windings for voltage transformation, essentially a higher voltage being transformed to a lower voltage and the excitation device 20 being operated on the lower voltage in the moving part, i.e. on the shaft 2.

In FIG. 1, the excitation device 20 in the form of a compact unit is located on the rotating shaft 2 and is activated by a transformer 25 for transmitting electrical power from the fixed part 21 to the rotating part 22 on the shaft 2. The excitation device 20 contains a circuit construction with electronic component parts, of which no further details are given in this context. Since the electronic component parts are sensitive to external fields, a shield 30 is necessary, which will be described in more detail below.

The shield 30 can include a complete hollow cylinder, which is pushed, as a housing, over the entire excitation device 20 including the transformer 25. The shield 30 can, however, also include individual elements, such as individual ferrite rings 31, which can be seen with reference to FIG. 2 below.

The housing or the shield 30 is advantageously made of magnetically highly conductive material, such as in particular steel. However, it can also be made of SMC (soft magnetic composite) materials, which, as a result of magnetic inclusions, realize the required magnetic properties despite being electrically very poorly conductive. These properties can also be achieved by a layer on the wall of the housing 30, which then advantageously can be made of nonferrous material, for example carbon fiber or the like. Further details will be given on this subject in the text which follows.

The shield 30 can be designed not to concomitantly rotate with the shaft 2 or else to concomitantly rotate with it. The advantage of the first alternative, i.e. a non-concomitantly rotating shield, is a mechanically simpler design. With such a design, in particular no centrifugal forces which need to be absorbed result from the rotating shield.

In the second alternative of a concomitantly rotating arrangement of the shield, on the other hand, no disruptive eddy currents occur as a result of a synchronously revolving rotary field of the synchronous machine.

For the practical application, when selecting the non-concomitantly rotating or rotating arrangement of the shield the arrangement of the excitation device 20 in relation to the stator winding 10 is taken into consideration. In particular when the excitation device is arranged directly below the winding heads 11, a concomitantly rotating arrangement is preferred. Otherwise, the stationary arrangement of the shield is to be selected as being advantageous.

Figure 4:
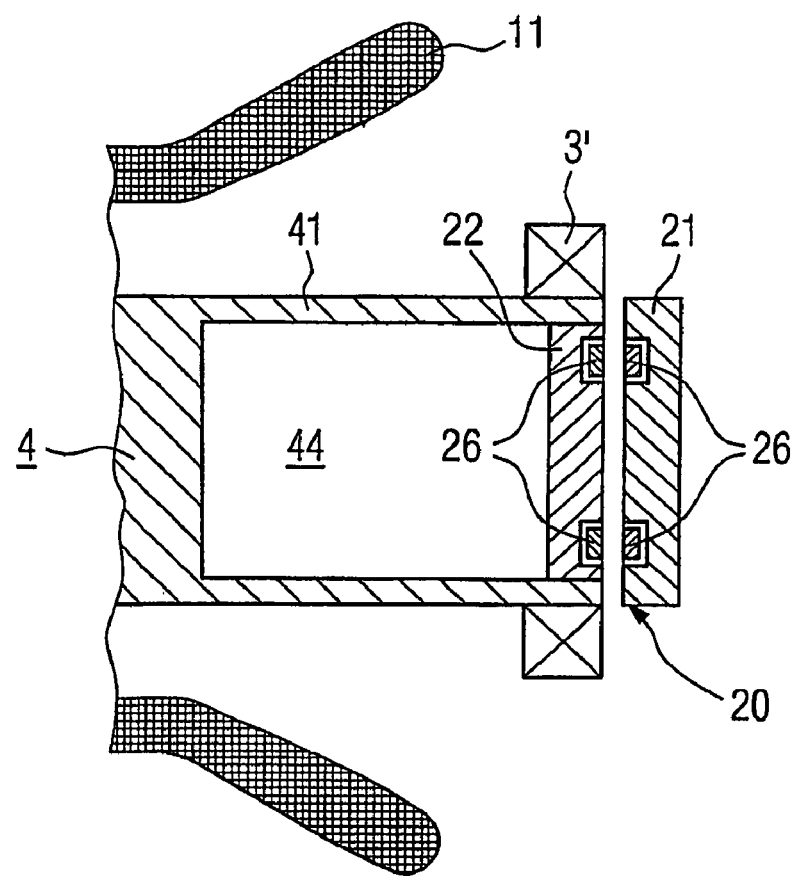
FIG. 4 is a partial sectional view of an alternative for the shield shown in FIG. 1a partial.

In a specific arrangement as shown in FIG. 4, which is formed by modifying FIG. 1, a cavity 44 is introduced into a shaft 4 in the end region 41, with the result that an inner, already magnetically shielded free space is formed for the magnetically sensitive excitation electronics.

The latter is expedient in particular in the case of machines with a high power in which the shaft has a sufficiently large diameter. In the case of smaller diameters, the shaft 2 from FIG. 1 can be extended in the end region and can be in the form of a hollow cylinder 41 with the inner free space 44. For this case, the mount 2' needs to be changed, while the fixed part of the excitation device 20 with the transformer windings of the transformer 25 remains substantially the same.

A receptacle for the complete excitation device 20 with the associated electronics can be provided in the free space 44 of the extended part 41 of the shaft 4. It is particularly advantageous here that, in the case of a shaft made of magnetic material, which is equally used as a magnetic shield, the centrifugal forces are kept markedly lower since an arrangement of the excitation electronics close to the axis can result in a diameter of the excitation device which is overall reduced in comparison with that in FIG. 1.

Figure 2:
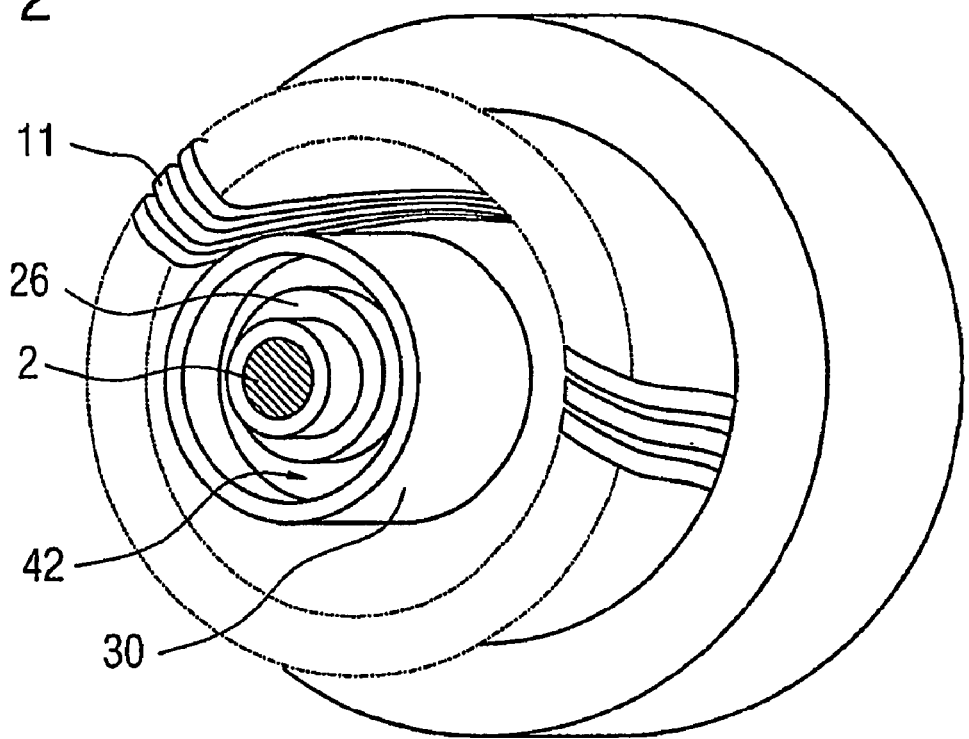
FIG. 2 is a perspective view from the front of the electric machine shown in FIG. 1.
Figure 3:
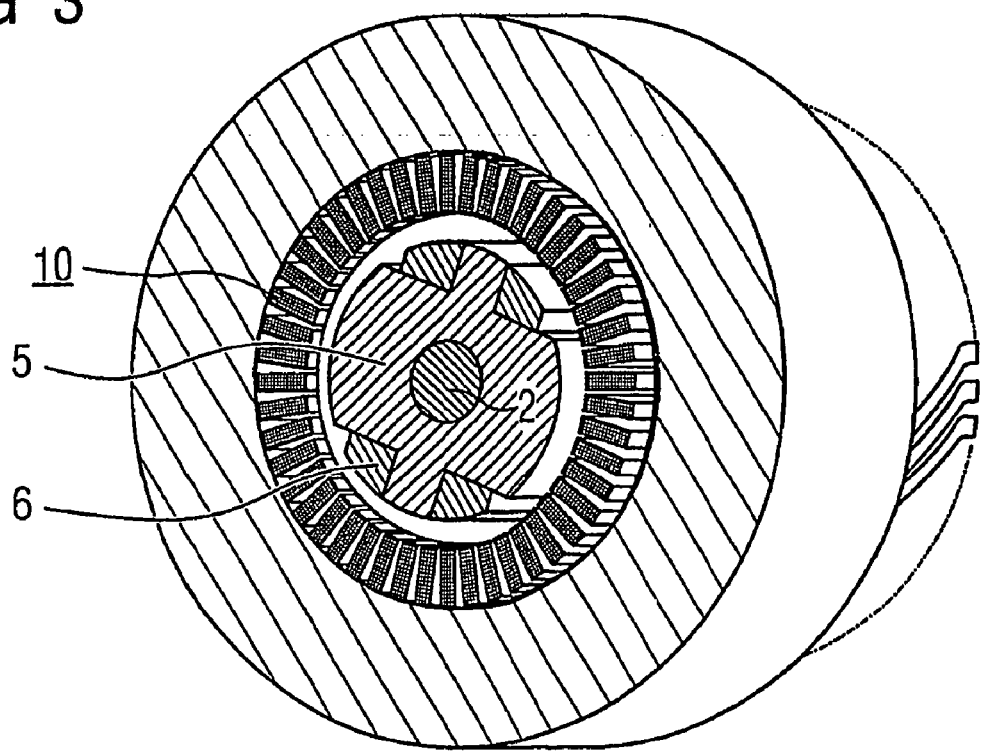
FIG. 3 is a sectional perspective view from the front of a section of the electric machine shown in FIG. 1 along the line III-III.

FIGS. 2 and 3 show the external design of the above-described machine. In particular in the view of the section in FIG. 3, the rotor 5 on the rotating shaft 2 can be seen, on which rotor the rotor winding, in particular a superconducting coil 6 made of HTS material, is located.

FIG. 2 only provides an overall indication of the excitation electronics with which the transmission of the input or output of energy, on the one hand, and the control of the superconducting coil 6 in the cold region, on the other hand, are ensured.

It is essential that when the component parts which belong to the excitation device outside or possibly inside a machine shaft are fitted, the shield realizes a housing, which surrounds all of the components. Specifically in FIG. 1, this housing can be replaced easily and as a result is more reliable and space-saving in comparison with separate housings, as are provided in the related art alternatively within the cold region, warm region and outside the entire machine housing. As a result of the compact arrangement, in this case in particular the feed lines can be reduced.

With the alternative shown in FIG. 4 which has already been explained above, a design of the electric machine which is essentially identical apart from the excitation region and corresponds to FIG. 1 results. A separate housing is in this case superfluous. Instead, it is essential that the machine shaft is extended in the region facing the exciter and accommodates the excitation device in its free space.

The hollow-cylindrical shaft part, as long as it is made of magnetically conductive material as is the shaft, can therefore form the shield for the excitation electronics equally in addition to accommodating the excitation device in FIG. 4. A particularly compact design of the machine is therefore possible.

Figure 5:
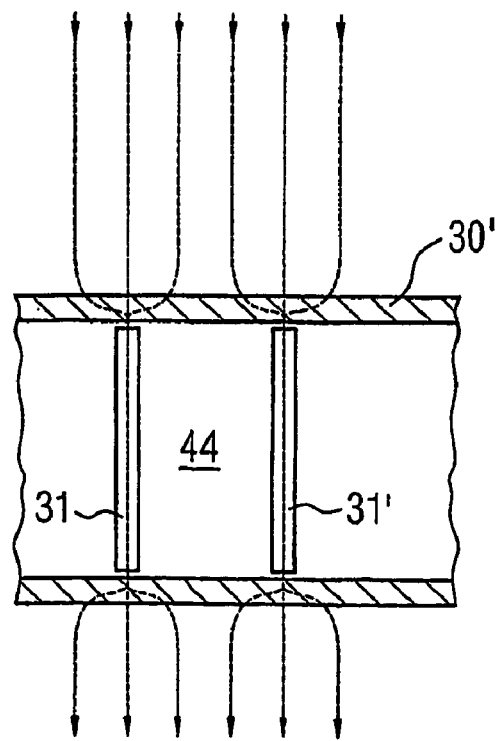
FIG. 5 is a partial sectional view of detail of a screen with additional elements.

In FIG. 5, elements 31, 31', . . . for flux guidance in the radial direction are introduced in a hollow cylinder 30' acting as the shield. Such elements 31, 31', . . . are realized by webs or disks on a material with good magnetic conductivity and are arranged at a distance within the hollow cylinder 30' with a minimum radial air gap.

With such an arrangement, a magnetic field is kept away from the interior of the hollow cylinder, in which the excitation electronics with component parts which are sensitive to magnetic fields are located, in a suitable manner. In particular when diametric fields are critical, the strength of the outer shield 30' can therefore be reduced.

When using flat disks as the field guidance elements, advantageously line bushings for the components of the excitation electronics are provided in the interior of the cylinder.

FIG. 5 shows individual lines of force. The specific arrangement shown in FIG. 5 therefore acts as a flux concentrator, with which the field strength distribution of the magnetic fields can be influenced in a desirable manner.

In FIGS. 1 to 5, the material of the shield 30 is in each case magnetically conductive steel. An alternative material with high permeability and low anisotropic electric conductivity is also provided, for example, by so-called soft magnetic composites (SMC). Such compound materials are in particular capable of being sintered and therefore can easily be brought into the desired form.

Alternatively, the shield can contain an outer covering, made of magnetically nonconductive material, on which the actual magnetic shield is formed by coating it with a material of high permeability. In this case, the outer covering can be made of corrosion-resistant material, for example stainless steel, the coating of the material of high permeability being located in particular on the inside.

Finally, it is also possible to use an outer covering of magnetically nonconductive material for the shield, with the actual magnetic shield being formed by rings made of a material of high permeability, for example Mu metal.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. An excitation device for driving and monitoring a rotor inductance of a synchronous machine having a stator winding with a winding head, comprising:
   a transformer providing bidirectional contactless transmission of energy to the rotor inductance, including a superconducting inductance; and
   a shield shielding the transformer against magnetic and electric fields produced by currents in the winding head of the stator winding and by the rotor inductance, thereby weakening external fields of said excitation device.

2. The excitation device as claimed in claim 1, wherein the excitation device is arranged between two mounts provided for the rotor inductance of the synchronous machine.

3. The excitation device as claimed in claim 1, wherein said shield does not concomitantly rotate.

4. The excitation device as claimed in claim 3, wherein said shield is formed of a material with high permeability.

5. The excitation device as claimed in claim 4, wherein said shield is formed of magnetically conductive steel.

6. The excitation device as claimed in claim 3, wherein the material of said shield has high permeability and low electrical conductivity.

7. The excitation device as claimed in claim 6, wherein said shield is formed of at least one soft magnetic composite.

8. The excitation device as claimed in claim 3,
   further comprising a rotating housing, and
   wherein said shield includes a first stationary screen made of steel with high permeability, enclosing all of said rotating housing of the excitation device.

9. The excitation device as claimed in claim 3, wherein said shield includes a stationary, laminated screen made of magnetic steel which surrounds the excitation device.

10. The excitation device as claimed in claim 1, wherein said shield concomitantly rotates.

11. The excitation device as claimed in claim 10,
    further comprising a rotating housing, and
    wherein said shield forms or surrounds all of said rotating housing of the excitation device.

12. The excitation device as claimed in claim 11, wherein said shield comprises:
    an outer covering, made of magnetically nonconductive material; and
    a coating on the outer covering formed of a material of high permeability that provides magnetic shielding.

13. The excitation device as claimed in claim 12, wherein the outer covering is made of corrosion-resistant material, and the coating of the material of high permeability is located inside of the outer covering.

14. The excitation device as claimed in claim 12, wherein the outer covering is made of stainless steel.

15. The excitation device as claimed in claim 13, wherein said shield further includes rings made of a material of high permeability providing magnetic shielding.

16. The excitation device as claimed in claim 15, wherein the rings are made of Mu metal.

17. The excitation device as claimed in claim 15, wherein the rotating housing is at least partially replaceable.

18. The excitation device as claimed in claim 15, wherein the excitation device includes a rotating part and a stationary part, coupled for the contactless energy transmission by said transformer.

19. The excitation device as claimed in claim 18, wherein said transformer has ferrite rings.

20. The excitation device as claimed in claim 18,
    wherein the synchronous machine includes a shaft that is at least partially hollow, and
    wherein the rotating part of the excitation device includes excitation electronics disposed within the shaft.

21. The excitation device as claimed in claim 20,
    wherein said shield is a hollow cylinder providing at least a partial cover for the excitation device, and
    wherein the excitation device further comprises at least one element made of magnetically highly conductive material disposed within the hollow cylinder and acting as a field concentrator.

22. The excitation device as claimed in claim 21, wherein the at least one element is magnetically highly conductive along a radius of the hollow cylinder and has line bushings for the excitation electronics distributed on two sides of the at least one element.

23. The excitation device as claimed in claim 1, wherein said shield is a hollow cylinder providing at least a partial cover for the excitation device.

24. The excitation device as claimed in claim 23, wherein said shield is made of magnetically highly conductive steel and forms an entire housing for the excitation device.

25. The excitation device as claimed in claim 24, wherein the entire housing is made of St37.

26. A synchronous machine, comprising:
    a stator winding with a winding head;
    a rotor with a rotor inductance, including a superconducting inductance; and
    an excitation device for driving said rotor and monitoring the rotor inductance, including
      a transformer providing bidirectional contactless transmission of energy to the rotor inductance, including the superconducting inductance; and
      a shield shielding the transformer against magnetic and electric fields produced by currents in the winding head of said stator winding and by the rotor inductance, thereby weakening external fields of said excitation device.

* * * * *